United States Patent
Morimoto

(10) Patent No.: US 9,849,373 B2
(45) Date of Patent: Dec. 26, 2017

(54) GAME SYSTEM, INFORMATION PROCESSING DEVICE, AND STORAGE MEDIUM

(71) Applicant: SQUARE ENIX CO., LTD., Tokyo (JP)

(72) Inventor: Hiroki Morimoto, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 700 days.

(21) Appl. No.: 14/308,155

(22) Filed: Jun. 18, 2014

(65) Prior Publication Data
US 2015/0011316 A1    Jan. 8, 2015

(30) Foreign Application Priority Data
Jul. 5, 2013   (JP) .................... 2013-142132

(51) Int. Cl.
| | |
|---|---|
| A63F 9/24 | (2006.01) |
| A63F 13/00 | (2014.01) |
| H04B 11/00 | (2006.01) |
| A63F 13/327 | (2014.01) |
| A63F 13/54 | (2014.01) |

(Continued)

(52) U.S. Cl.
CPC .......... *A63F 13/00* (2013.01); *A63F 13/323* (2014.09); *A63F 13/327* (2014.09); *A63F 13/54* (2014.09); *H04B 11/00* (2013.01); *A63F 2300/6081* (2013.01); *G10L 19/018* (2013.01)

(58) Field of Classification Search
USPC ..................................................... 463/31–42
See application file for complete search history.

(56) References Cited

U.S. PATENT DOCUMENTS

| | | | |
|---|---|---|---|
| 8,984,338 B2 * | 3/2015 | Cho .................. | H04L 12/12 714/30 |
| 9,022,863 B2 * | 5/2015 | Ando .................. | A63F 13/69 463/11 |

(Continued)

FOREIGN PATENT DOCUMENTS

| | | |
|---|---|---|
| EP | 2540361 | 1/2013 |
| EP | 2611049 | 7/2013 |

(Continued)

OTHER PUBLICATIONS

Office Action from Japan Patent Office (JPO) in Japanese Patent Application No. 2013-142132, dated Oct. 23, 2015, together with a partial English language translation.

(Continued)

*Primary Examiner* — Masud Ahmed
(74) *Attorney, Agent, or Firm* — Greenblum & Bernstein, P.L.C.

(57) ABSTRACT

A data communication restricted content providing device executes a program of game content, accepts operation input for the game content, controls the game content in accordance with operation input, generates, based on information of a changed progress condition of the game content, audio data indicating the progress condition, and plays back the audio data. An information processing device acquires an audio signal played back by the content providing device, extracts information of the progress condition from the audio signal, and outputs, to an external device, information of the progress condition.

8 Claims, 8 Drawing Sheets

(51) Int. Cl.
*A63F 13/323* (2014.01)
*G10L 19/018* (2013.01)

(56) References Cited

U.S. PATENT DOCUMENTS

| | | | |
|---|---|---|---|
| 2004/0031856 | A1 | 2/2004 | Atsmon et al. |
| 2005/0075134 | A1 | 4/2005 | Steenstra et al. |
| 2006/0136544 | A1* | 6/2006 | Atsmon .................. A63H 3/28 709/200 |
| 2009/0233582 | A1* | 9/2009 | Suzuki .................. H04B 11/00 455/414.1 |
| 2012/0051187 | A1* | 3/2012 | Paulson .................. H04B 1/06 367/135 |
| 2012/0214416 | A1 | 8/2012 | Kent et al. |
| 2013/0005490 | A1* | 1/2013 | Ooya .................. A63F 13/533 463/43 |
| 2013/0079057 | A1* | 3/2013 | Bell .................. H04M 1/505 455/556.1 |
| 2013/0196733 | A1 | 8/2013 | Cage et al. |
| 2013/0203462 | A1* | 8/2013 | Tahk .................. G06F 3/04845 455/556.1 |
| 2013/0203492 | A1* | 8/2013 | Yum .................. A63F 13/06 463/31 |
| 2014/0235336 | A1* | 8/2014 | Morimoto .................. A63F 13/12 463/31 |

FOREIGN PATENT DOCUMENTS

| | | |
|---|---|---|
| JP | 2006-087620 | 4/2006 |
| JP | 2009-101035 | 5/2009 |
| JP | 2009-125107 | 6/2009 |
| JP | 2010-099144 | 5/2010 |
| JP | 2010-110566 | 5/2010 |
| JP | 2013-013509 | 1/2013 |
| WO | 2013/030672 | 3/2013 |
| WO | 2013/116752 | 8/2013 |
| WO | 2013/166567 | 11/2013 |

OTHER PUBLICATIONS

Office Action from Japan Patent Office (JPO) in Japanese Patent Application No. 2013-142132, dated May 11, 2015, along with a partial English language translation thereof.
Extended European Search Report (EESR) from European Patent Office (EPO) in European Patent Application No. 14172782.6, dated Jan. 12, 2015.
Anonymous, "Why lady Gaga Could Deploy a Sound Only Your Smartphone Can Hear [Updated]", Retrieved from the Internet: URL:http://evolver.fm/2012/02/07/why-ladygaga-deploys-a-sound-only-your-smartphonecan-hear/, Retrieved on: Nov. 18, 2014, XP55153642 (Feb. 7, 2012).
Anonymous, "SonicNotify: The inaudible QR codes your smartphone can hear", Retrieved from the Internet: URL:http://www.gizmag.com/sonicnotify-audio-signals/21385/, Retrieved on: Nov. 11, 2014, XP55152250 (Feb. 8, 2012).
Anonymous, "Chirp lets you send a weblink with a tune", Retrieved from the Internet: URl:http://www.newscientist.com/article/dn22087-chirp-lets-you-send-a-weblink-with-a-tune.html#.
VGHeIWOwVot , Retrieved on: Nov. 11, 2014, XP55152199 (Jul. 20, 2012).
Anonymous, "Andy Hawkes", Retrieved from the Internet: URL:http://iam.andyhawkes.co.uk/day/2012/07/11, Retrieved on: Nov. 11, 2014, XP55152202 (Jul. 11, 2012).
Anonymous, "NFC-like Zoosh Uses Audio for Short-Range Data; Do We Need It?", Retrieved from the Internet: URl:http://pocketnow.com/smartphone-news/nfc-like-zoosh-uses-audio-for-short-range-data-do-we-need-it, Retrieved on: Nov. 11, 2014, XP55152304 (Jun. 20, 2011).
Official Action from European Patent Office (EPO) in European Patent Application No. 14172782.6, dated Jul. 12, 2017.

* cited by examiner

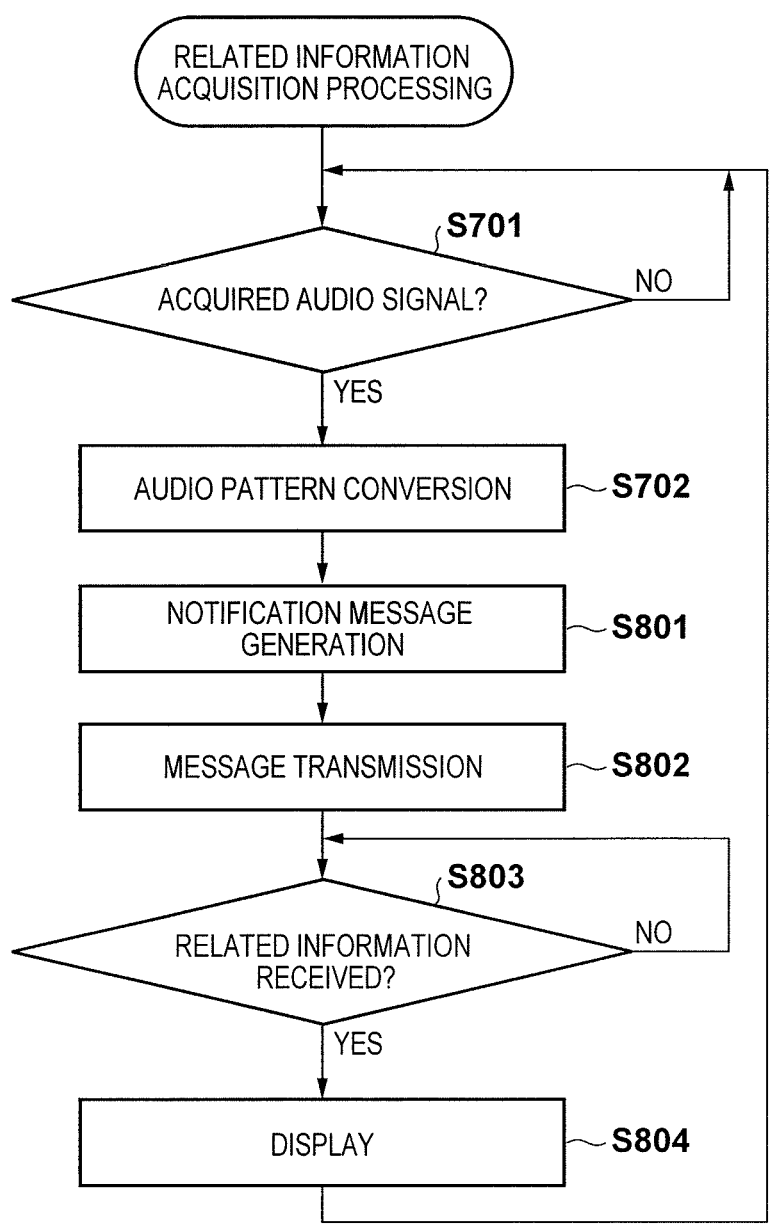

GAME SYSTEM, INFORMATION PROCESSING DEVICE, AND STORAGE MEDIUM

BACKGROUND OF THE INVENTION

Field of the Invention

The present invention relates to a game system, an information processing device, and a storage medium, and in particular to information sharing in a game system in which data communication between devices is restricted.

Description of the Related Art

In recent years, various devices, such as home-use game consoles and mobile telephones, have data communication functions that use communication networks such as the Internet. Because these kinds of devices are capable of performing data communication with other devices using data communication functions, there are those that provide a user experience in which a plurality of devices coordinate for content such as a video game. In Japanese Patent Laid-Open No. 2013-013509, a system is disclosed in which a portable game device receives information relating to a progress condition of a game from a stationary game device, and displays content related information corresponding to game strategy information, or the like.

As a premise of the system of Japanese Patent Laid-Open No. 2013-013509, the stationary game device and the portable game device are capable of data communication via a network. However, there are cases in which for conventional stationary game devices, the devices capable of data communication, or the information that is outputtable externally using communication functions during a provision of game content is restricted from a security perspective. In other words, in a situation in which data communication between the devices is restricted, or in which the information outputtable by communication is restricted, a user experience realized by the system of Japanese Patent Laid-Open No. 2013-013509 cannot be provided.

Meanwhile, in Japanese Patent Laid-Open No. 2010-099144, a system is disclosed in which game result information and a URL of a server to which to upload the result information are displayed on a screen as a QR code (registered trademark), and it is possible to upload the result information to the server via a mobile terminal having a camera by recognizing the QR code using the mobile terminal. In such a system, because the result information can be conveyed from the game device to the mobile terminal without using a data communication function, even in a situation in which data communication between the devices is restricted, a user experience in which a plurality of devices coordinate can be provided.

However, in cases where the method of Japanese Patent Laid-Open No. 2010-099144 is used, it is necessary to display a two-dimensional bar code such as a QR code, which is unrelated to the game, within the display area of the screen of the game content displayed by a display device. Furthermore, because it is necessary to operate the mobile terminal in order to recognize the code, it is particularly cumbersome for a user during operation of the game content.

SUMMARY OF THE INVENTION

The present invention was made in view of such problems, and provides a game system, an information processing device, and a storage medium. A feature of the present invention is that information of content provided on a device, for which information communication is restricted, is easily output.

According to an aspect of the present invention, there is provided a game system comprising an information processing device, a content providing device, and an external device. The content providing device comprises an execution unit configured to execute a program of game content to be provided, an input unit configured to accept operation input for the game content, a control unit configured to control the game content in accordance with operation input accepted by the input unit, and an audio output unit configured to generate, based on information of a progress condition of the game content caused to change by the control unit, and cause a play back unit to play back, audio data indicating the progress condition. The information processing device comprises an acquisition unit configured to acquire an audio signal played back by the play back unit, an extraction unit configured to extract information of the progress condition from the audio signal acquired by the acquisition unit, and an output unit configured to output, to the external device, information of the progress condition extracted by the extraction unit.

According to an aspect of the present invention, there is provided an information processing device, comprising an acquisition unit configured to acquire an audio signal played back by a play back unit, based on audio data including information of a progress condition of game content that the content providing device provides, the audio data having been output from the content providing device, an extraction unit configured to extract information of the progress condition from the audio signal acquired by the acquisition unit, and an output unit configured to output to an external device information of the progress condition extracted by the extraction unit.

Further features of the present invention will become apparent from the following description of exemplary embodiments (with reference to the attached drawings).

BRIEF DESCRIPTION OF THE DRAWINGS

FIG. 8 is a flowchart showing an example of related information acquisition processing executed on the smart phone 300 according to embodiments of the present invention.

DESCRIPTION OF THE EMBODIMENTS

[Embodiments]

Below, detailed explanation for explanatory embodiments of the present invention will be given with reference to the drawings. Note, in the embodiments explained below, an example will be explained in which a game system, comprising a stationary game device, as a content providing device, that executes a program of game content for which progress changes in accordance with operations by a user, and a smart phone, as an information processing device, having an audio acquisition function, and a communication function for communicating with an external device, is applied to the present invention. However, working of the present invention is not limited to this. For example, the content providing device is not limited to stationary game devices, and may be any device capable of providing content for which progress conditions change in accordance with operations by the user. Also, the information processing device is not limited to a smart phone, and may be any device having an audio acquisition function and an output function.

Note, as a premise, in the game system of this embodiment, the stationary game device and the smart phone cannot perform data transmission and receiving directly. In other words, as explained above, a restriction on the communication that is executable for game content is put in place by the seller of the stationary game device, for example, and transmitting information obtained during execution of the game content to the smart phone directly is inhibited.

<System Configuration of the Game System>

Figure 1:
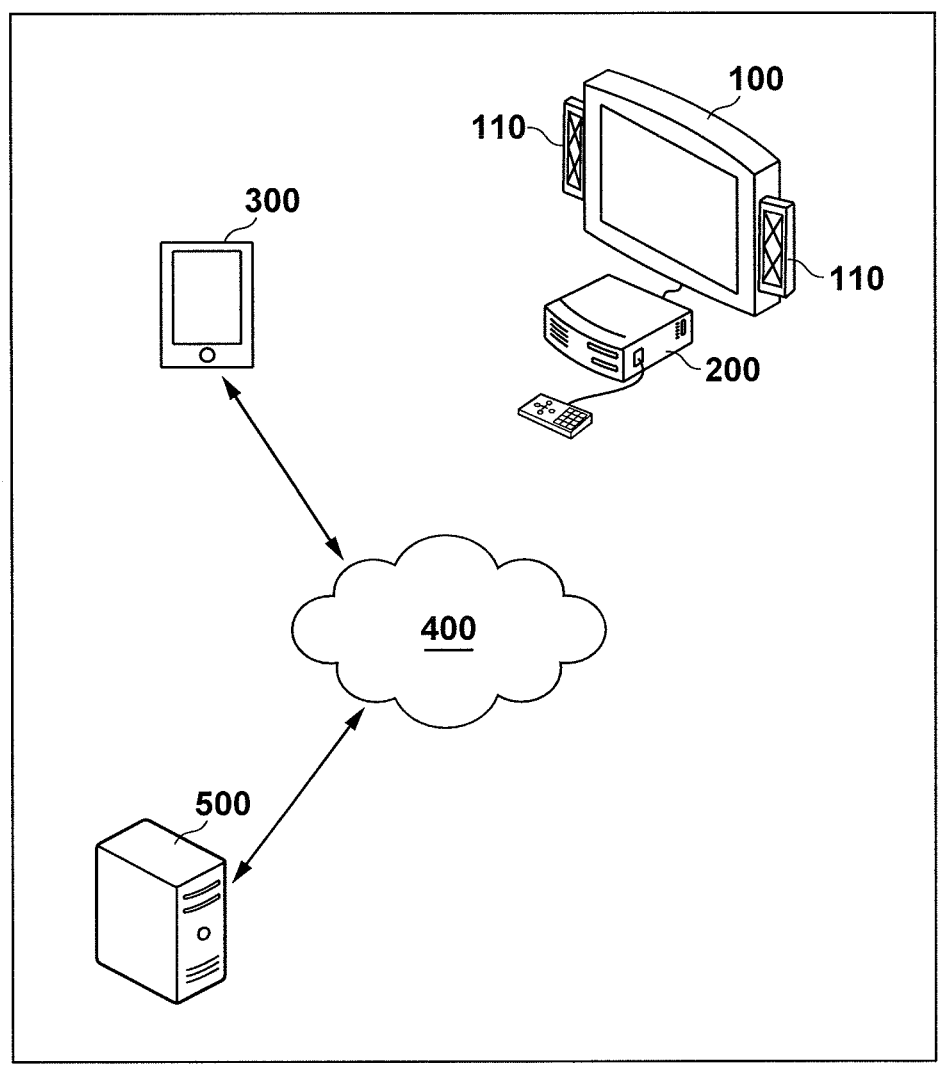
FIG. 1 is a view showing a system configuration of a game system according to embodiments of the present invention.

FIG. 1 is a view showing a system configuration of the game system according to embodiments of the present invention. As shown in the figure, the game system comprises a stationary game device 200 and a smart phone 300.

In cases in which game content is executed on the stationary game device 200, game screens for the game content are output to a connected display 100 and displayed. Also, audio signals output by playing back audio data of the game content are output as audio from a connected speaker 110. Note, in this embodiment, explanation is given having the speaker 110 and the display 100 be configured to be in a single body, but the speaker 110 and the display 100 may be arranged separately.

The smart phone 300 has at least one later described microphone (hereinafter, simply referred to as "mic") and collection of surrounding audio is possible. Also, the smart phone 300 has a wireless communication function and communication with an external SNS (Social Networking Service) server 500 via a network 400 is possible. In this embodiment, it should be easily understood that while explanation is given having the smart phone 300 connectable to the network 400 by wireless communication, the connection is not limited to wireless communication, and may be by wired communication.

<Operation Overview>

Explanation is given below for an operation overview for making a notification to another device on a network, or sharing with another device, progress conditions of game content being executed on the stationary game device 200, as a play-by-play, in the game system of this embodiment.

As explained above, because the stationary game device 200 and the smart phone 300 of this embodiment cannot perform data communication directly, in this embodiment progress conditions of the game content are transmitted using audio. In general, in the stationary game device 200, during execution of the game content, play back of audio signals is permitted. In the stationary game device 200 of this embodiment, information indicating a progress condition of the game content is converted into an audio signal, played back, and output as audio from the connected speaker 110. Meanwhile, the smart phone 300 acquires the audio output from the speaker 110 with the mic. By doing this, in the game system of this embodiment, the progress conditions of the game content can be transmitted to the smart phone 300 from the stationary game device 200 without relying on data communication.

The audio acquired in the smart phone 300 (analog audio signal) is convertible into a progress condition of the game content by predetermined conversion processing being applied. This can be realized by information of a predetermined rule being applied in the generation of audio signals in the stationary game device 200 being known beforehand in a corresponding application executed on the smart phone 300. The generated audio signal may be something that corresponds to a predetermined bit sequence that identifies a field that an operation target character is capable of arriving at, or a battle opponent character in the game content, for example. Alternatively, it may correspond to a waveform obtained by converting numeric value information such as a level of an operation target character or a score in the game content based on a predetermined rule. Note, the progress conditions output as audio are not limited to the above, and configuration may be taken having various items be output as progress conditions for different game content.

Also, in this embodiment, explanation is given having the stationary game device 200 play back by generating the audio signals in accordance with progress conditions of the game content, but working of the present invention is not limited to this. For example, configuration may be taken where the audio signals played back for each field that an operation target character is capable of arriving at are predetermined, and rather than generating the audio signal on the fly in accordance with the progress conditions, the determined audio signals are played back. Also, in this embodiment, explanation is given having the generated audio signals be overlapped on an audio signal, such as the background music arranged for dramatic effect in the game content, and played back, but working of the present invention is not limited to this. In other words, if the background music is of a configuration such that it is possible to distinguish the progress conditions (for example, the current scene that the operation target character is facing), delivery of the information of the progress conditions may be performed using the background music, or the like.

In cases where audio signals are played back according to generation rules, audio that does not feel out of place for the user can be considered, and configuration may be taken such that the audio signals are signals of a frequency band difficult for humans to perceive. Because it is assumed that general commercial speakers will be connected to the stationary game device 200, in such cases the bandwidth that the audio signals comprise in may be selected to be a high-frequency band or a low-frequency band, out of frequency bands outputtable by general speakers.

In the smart phone 300, a notification message of the progress condition is generated in accordance with a predetermined format based on information of the progress condition of the game content obtained by conversion. In this embodiment, the information obtained in the smart phone 300 is something with which notification of another device or information sharing with another device is performed using an SNS such as Facebook (registered trademark) or Twitter (registered trademark). In other words, a notification message configured in accordance with a predetermined format for message posting in the SNS used is uploaded to a corresponding server (the SNS server 500). Then, messages posted to the SNS server 500 are transmitted to terminals in accordance with access requests from terminals connectable to the SNS server 500.

Note, in the game system of this embodiment, the processing for posting from audio analysis in the smart phone 300 is automated, and the information of the progress conditions of the game content is shared without the necessity for operation of the user. In other words, the progress conditions of the game content can be uploaded to the SNS like a play-by-play at a predetermined timing simply by the user playing the game content using the stationary game device 200 as normal after activating the corresponding application on the smart phone 300.

Note, in this embodiment, explanation is given having the upload destination for the progress conditions of the game content be an SNS server 500, but working of the present invention is not limited to this. In the present invention, the progress conditions of the game content are not limited to being transmitted to an SNS server, for example, and may be transmitted to anything capable of notification or sharing with an external device without the operation of the user; they may be transmitted to a smart phone, or the like, of another user. Also, a configuration may be taken in which the progress conditions are transmitted directly to an external device within a predetermined distance, such as by Bluetooth (registered trademark) or adhoc communication, without passing through a public network such as the Internet.

<Functional Configuration of the Stationary Game Device 200>

Figure 2:
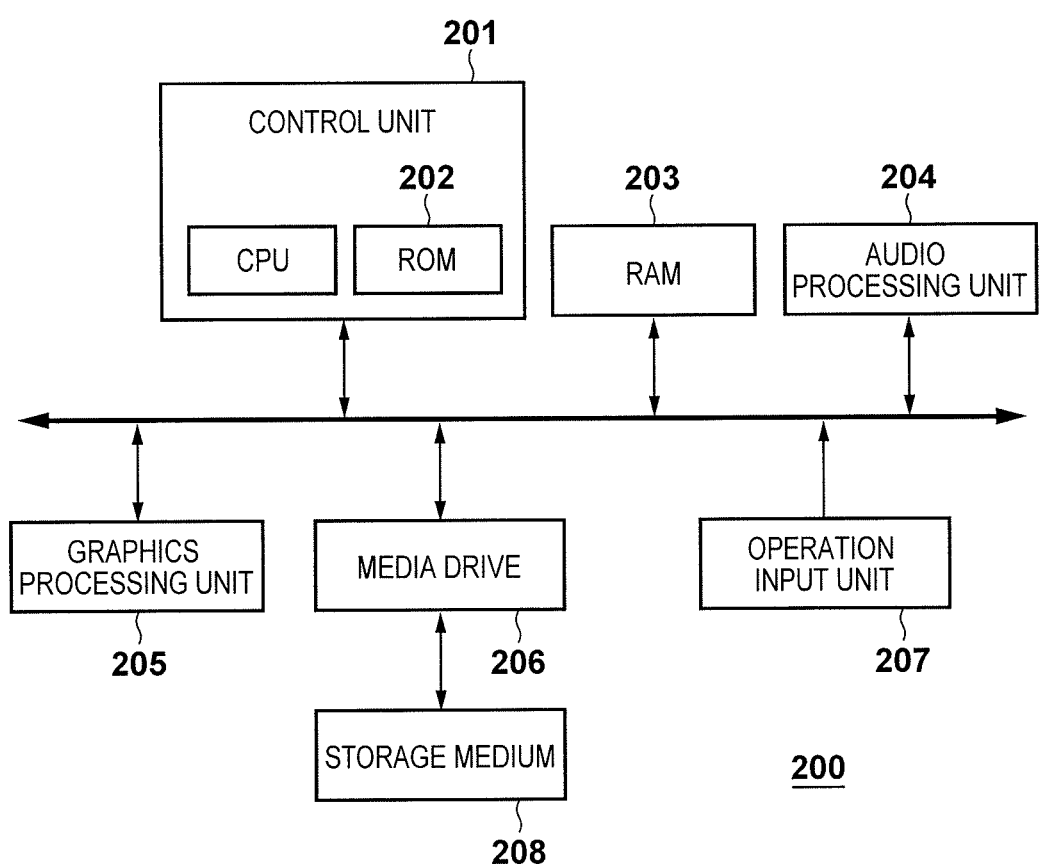
FIG. 2 is a block diagram showing a functional configuration of a stationary game device 200 according to embodiments of the present invention.

FIG. 2 is a block diagram showing a functional configuration of the stationary game device 200 according to embodiments of the present invention. The stationary game device 200 comprises a control unit 201, a RAM (Random Access Memory) 203, an audio processing unit 204, a graphics processing unit 205, a media drive 206, and an operation input unit 207. These blocks are each connected to each other via an internal bus. Note, each block may be realized by hardware such as one or more signal processing unit and/or application specific integrated circuit, by software or by a combination of both.

The control unit 201 is comprised of a CPU in which one or more processing cores and caches are configured, and a ROM (Read Only Memory) 202. The control unit 201 controls the operation of each block that the stationary game device 200 comprises. Specifically, the control unit 201 controls the operation of each block by executing operation programs of each of the blocks stored in the ROM 202 or in a storage medium 208 by reading out the programs and loading them into the RAM 203. The RAM 203 is a volatile memory, and is used not only as a loading area of the operation programs of each of the blocks, but also as a storage area for storing intermediate data output in the operation of each block, and the like.

The media drive 206 is a so-called optical drive which reads out game programs for game content to be executed from a storage medium 208 such as a mounted DVD-ROM, CD-ROM, or the like. The storage medium 208 is a medium for providing the game content known as so-called "game software" in which, in addition to game programs, data referenced accompanying the execution of the game programs is stored. The game programs and data read out by the media drive 206 are loaded into the RAM 203. Note, the storage medium 208 is not limited to the above described the DVD-ROM, and may be a different medium such as a cartridge or a memory card. In such cases, the connection of the medium may be configured to be a predetermined slot having contacts with connection terminals of the medium rather than being an optical drive.

The audio processing unit 204 plays back audio data (an audio signal) read out from the storage medium 208, and outputs to the connected speaker 110. Also, the audio processing unit 204 performs the generation of audio signals corresponding to the progress conditions of the game content being executed.

The graphics processing unit 205 renders corresponding game screens in accordance with rendering commands output from the control unit 201 in the execution of the game content. The graphics processing unit 205 converts the rendered game screens into video signal in accordance with a video output format, and outputs to the display 100.

The operation input unit 207 is a user interface of the stationary game device 200. The user interface of the stationary game device 200 may be a game pad, for example, and the operation input unit 207 detects operation input performed on the game pad, converts to corresponding control signals, and outputs them to the control unit 201. The control unit 201, having received the control signal, updates the values of various parameters that are stored in the RAM 203 and used in calculation processing for the generation of game screens, for example.

<Functional Configuration of the Smart Phone 300>

Figure 3:
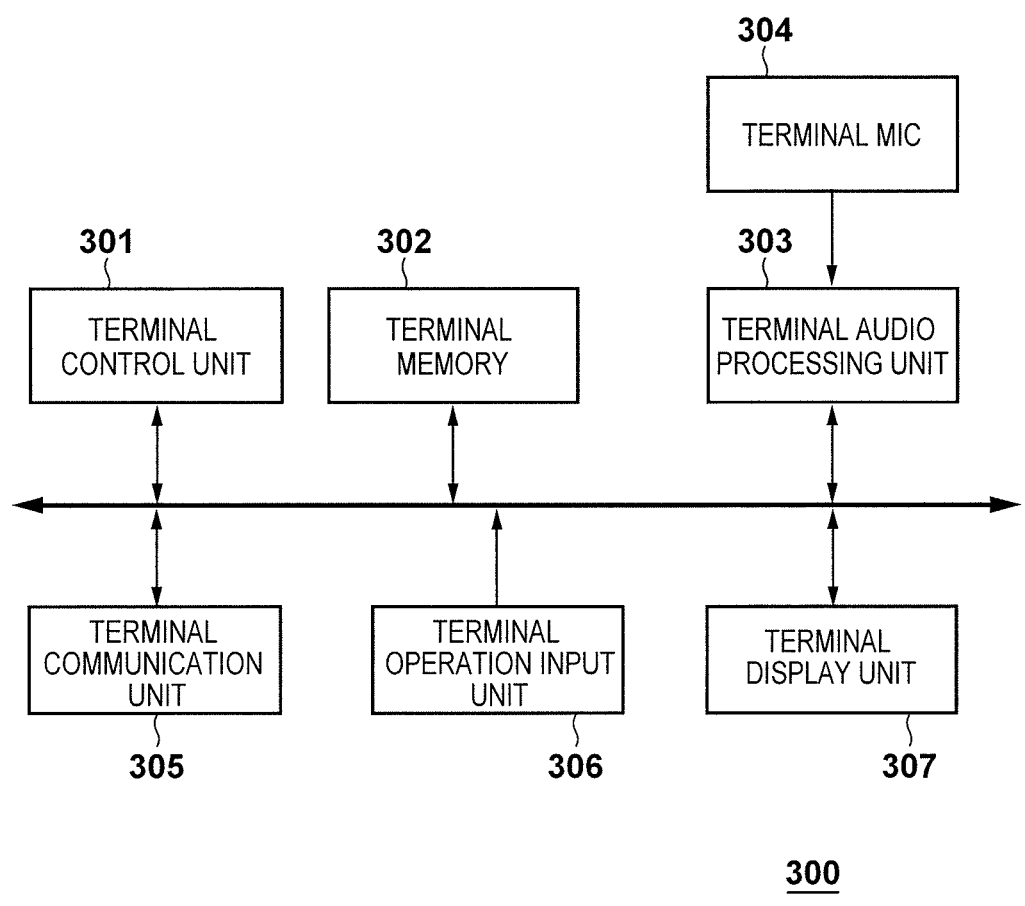
FIG. 3 is a block diagram showing a functional configuration of a smart phone 300 according to embodiments of the present invention.

FIG. 3 is a block diagram showing a functional configuration of the smart phone 300 according to embodiments of the present invention. The smart phone 300 comprises a terminal control unit 301 (one or more processing unit (CPU)), a terminal memory 302 (including one or more non-transitory computer-readable storage medium), a terminal audio processing unit 303, a terminal mic 304, a terminal communication unit 305, a terminal operation input unit 306, and a terminal display unit 307, and these blocks are each connected to each other via an internal bus. Note, in the explanation of this embodiment, in order to distinguish between the blocks that the stationary game device 200 comprises and the blocks that the smart phone 300 comprises, the prefix "terminal" is given to the latter. Note, each block may be realized by hardware such as an application specific integrated circuit, by software or by a combination of both.

The terminal control unit 301 controls the operation of each block that the smart phone 300 comprises. Specifically, the terminal control unit 301 controls the operation of each block by executing operation programs of each of the blocks stored in the terminal memory 302, by reading out the programs and loading them into a loading memory (not shown).

The terminal memory 302 is used not only as a storage area for storing the operation programs of each of the blocks that the smart phone 300 comprises, but also as a storage area for storing user data stored in the operation of the blocks, output intermediate data, and the like.

The terminal mic 304 is an audio input interface that the smart phone 300 comprises. The terminal mic 304 outputs an input analog audio signal to the terminal audio processing unit 303 when audio input is detected. The terminal audio processing unit 303 converts an analog audio signal acquired by the terminal mic 304 into digital audio data. In addition, the terminal audio processing unit 303 extracts information that indicates a progress condition of the game being executed on the stationary game device 200 from the audio data.

The terminal communication unit 305 is a communication interface that the smart phone 300 comprises. The terminal communication unit 305 performs data transmission and receiving with the SNS server 500 via the network 400 in accordance with a predetermined protocol. The terminal control unit 301 transmits the extracted information of the progress condition to the SNS server 500 via the terminal communication unit 305.

The terminal operation input unit 306 is a user interface that the smart phone 300 comprises such as a touch panel or a button. The terminal operation input unit 306 analyzes operation input performed on a corresponding device by a user, and transmits control signals corresponding to the operation input to the terminal control unit 301. The user can operate each application executed on the smart phone 300 via the terminal operation input unit 306.

The terminal display unit 307 is a user interface that the smart phone 300 comprises. On the terminal display unit 307 screen data for the applications executed on the smart phone 300 is displayed.

<Progress Condition Output Processing>

Figure 4:
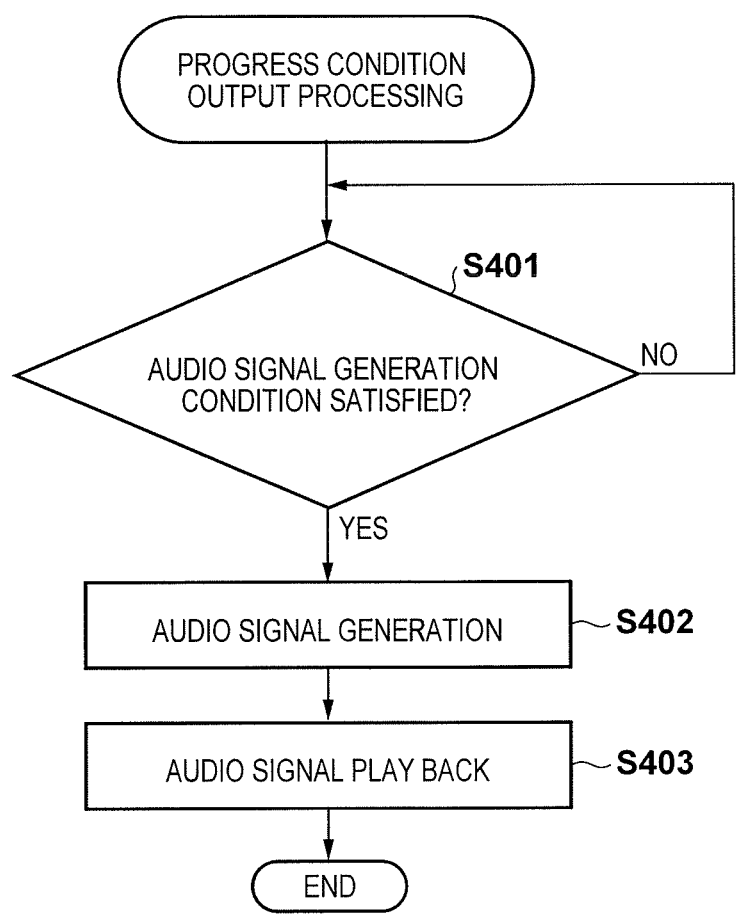
FIG. 4 is a flowchart showing an example of progress condition output processing executed on the stationary game device 200 according to embodiments of the present invention.

Explanation will be given of specific processing for the progress condition output processing executed on the stationary game device 200 of this embodiment having this kind of configuration, using the flowchart of FIG. 4. Note, explanation is given having the progress condition output processing be initiated when execution of a game program corresponding to game content is initiated in the stationary game device 200, for example, and executed repeatedly during the execution of the game program.

In step S401, the control unit 201 determines whether or not a progress condition of the game content satisfies a condition for generating the audio signal. For example, the condition for generating the audio signal could be set to cases in which the progress conditions for the game content reach a predetermined state such as:

when a predetermined key point (a position of an operation target character, a specific stage in the story, etc.) for the game content is reached when a level of an operation target character increases when a high-score is updated for the score for the play of the user in the game content when a battle opponent character (a boss character) having a predetermined difficulty level is encountered, or when such a character is beaten when a rare item is acquired.

Figure 5:
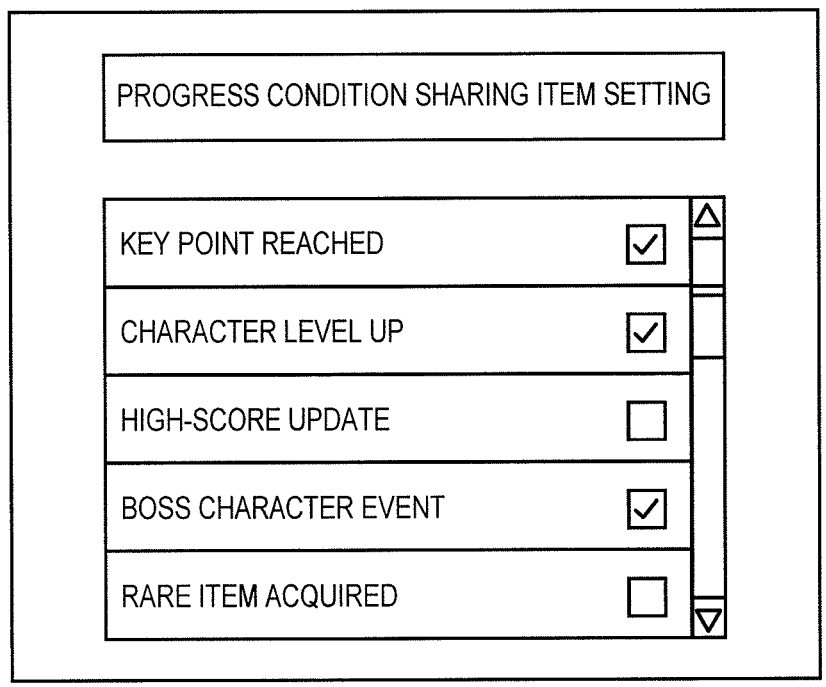
FIG. 5 is a view showing an example of a GUI for setting progress conditions output as audio signals according to embodiments of the present invention.

Note, the progress conditions may be determined based on parameters updated in accordance with the operations of the user, for example, and the determination of this step may be performed after identification of the progress conditions is performed based on the parameters in predetermined frame intervals. Also, configuration may be taken such that the progress conditions for which audio signals are generated are user settable beforehand via a GUI in the game content such as that of FIG. 5. Alternatively, configuration may be taken such that the frequency that audio signals are generated is controllable by changing a sharing level of sharing items set beforehand.

The control unit 201 moves the processing to step S402 in cases in which it determines that the progress condition of the game content satisfies the conditions for generating the audio signal, and the processing of this step repeats in cases where it determines that the conditions are not satisfied.

In step S402, the audio processing unit 204, under the control of the control unit 201, generates an audio signal in accordance with a progress condition of the game content. Specifically, the audio processing unit 204 reads out information indicating the progress condition of the game content for the generation of the audio signal from the RAM 203, and generates the audio signal in accordance with the information.

Figure 6:
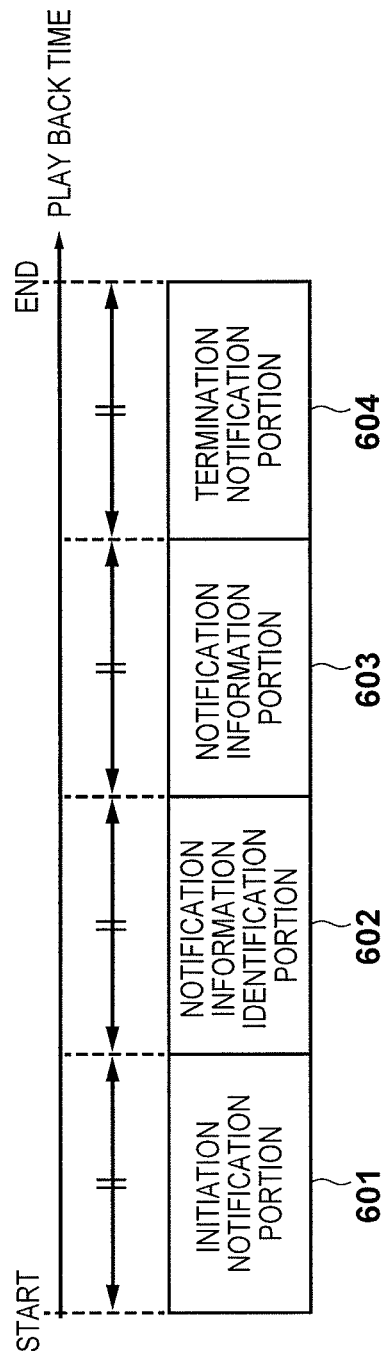
FIG. 6 is a view showing an example of a configuration of an audio signal indicating a progress condition according to embodiments of the present invention.

The audio signal is generated in accordance with a format such as that shown in FIG. 6, for example. As shown in the figure, the audio signal, in order that they are played back, is comprised of:

an initiation notification portion 601 corresponding to an initiation signal for causing an external device (the smart phone 300 in this embodiment) to recognize the initiation of the audio for notifying the progress condition.

a notification information identification portion 602 for indicating the type of the information for notifying in the audio (for example, a level increase, etc.)

a notification information portion 603 for indicating details of the information for notifying in the audio (for example, a level value)

a termination notification portion 604 corresponding to a termination signal for causing the external device to recognize the termination of the audio for notifying of the progress condition.

Because, out of these, the initiation notification portion 601 and the termination notification portion 604 are fixed and do not depend on the content of the progress condition being notified, they indicate a fixed audio waveform. Also, for the notification information identification portion 602, an audio signal having a corresponding audio waveform from out of audio waveforms prepared for each predetermined notification item is used. On the other hand, for the notification information portion 603, for cases such as predetermined key points and the like, an audio waveform may be selected from audio waveforms prepared beforehand similarly to the notification information identification portion 602, but for values that can fluctuate such as high-scores and level values, it may not be realistic to prepare audio patterns beforehand. For this reason, in the latter case, the audio signal may be configured in accordance with audio waveform generation rules in accordance with a numeric sequence or a bit sequence. For example, in a case where a level value is "13", an audio signal may be generated to have a corresponding waveform so as to line up in chronological order as "1" "3" in base 10, as "0" "D" in base 16, and as "1" "1" "0" "1", in a bit sequence.

Note, in order to simplify audio detection and recognition processing in the external device, configuration may be taken such that the audio signal comprises equal play back times such that the play back initiation times of the initiation notification portion 601, the notification information identification portion 602, the notification information portion 603, and the termination notification portion 604 line up at equal time intervals. For the audio played back in each portion, the play back time is envisioned to change in accordance with a data length of the data that the signal indicates, and in cases where audio recognition is performed by pattern matching, or the like, it can be considered that a recognition rate will deteriorate by audio having differing times being played back consecutively. For this reason, the recognition processing complexity can be reduced by having the play back initiation times of the audio signals for each portion be at equal time intervals so that it is possible to easily recognize the range of the audio that the external device should recognize.

Also, in this embodiment, explanation was given having audio signals of the configuration shown in FIG. 6 be generated, but working of the present invention is not limited to this. In other words, so long as the audio signal generated in this step is information capable of transmitting a progress condition of the game content to the external devices, it is possible to change the format as appropriate.

In step S403, the audio processing unit 204, under the control of the control unit 201, plays back the generated audio signal, and outputs to the speaker 110, and the progress condition output processing completes. Here, in cases where an audio signal such as background music played back unrelatedly to the change in the progress conditions in the execution of the game content exists, as explained above, the audio processing unit 204 overlaps the audio signal corresponding to the progress condition with the audio signal, and plays back. In cases where overlapping of the audio signal is performed, audio signals corresponding to the progress condition may be generated in a frequency band not used by the background music, and overlapped. Note, the play back of the audio signal corresponding to the progress condition by the audio processing unit 204 may be performed repeatedly in order to improve a detection rate in the external device.

<Progress Condition Sharing Processing>

Figure 7:
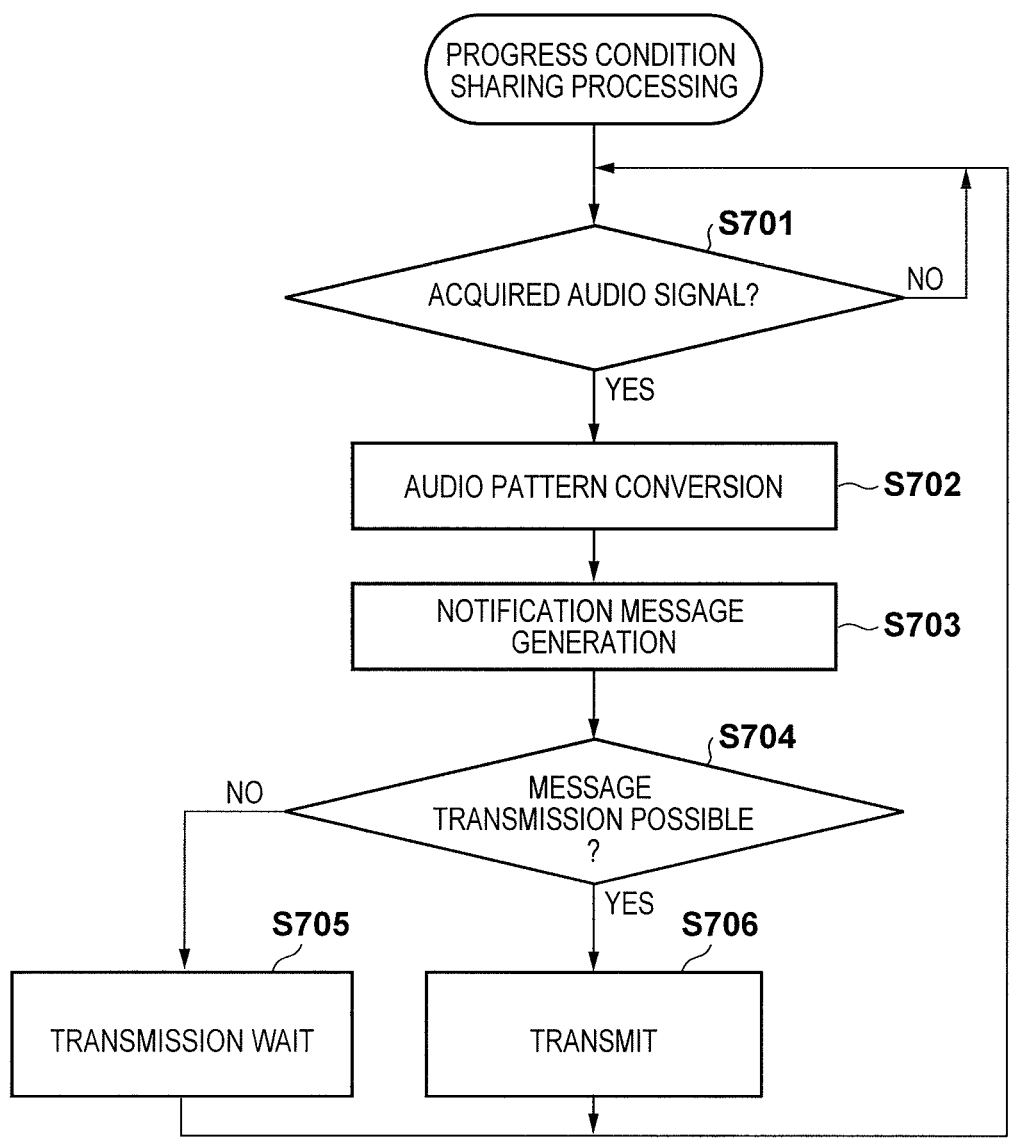
FIG. 7 is a flowchart showing an example of progress condition sharing processing executed on the smart phone 300 according to embodiments of the present invention.

Next, using the flowchart of FIG. 7, explanation will be given for progress condition sharing processing for acquiring the audio signal corresponding to the progress condition played back by the stationary game device 200 executed on the smart phone 300 of this embodiment and transmitting to the SNS server 500 in order to share the progress condition with another external terminal. Note, the progress condition sharing processing will be explained as something that is initiated when an activation of a corresponding application is instructed in the smart phone 300, for example.

In step S701, the terminal control unit 301 determines whether or not an audio signal for notifying a progress condition of the game content is acquired. In the execution of the progress condition sharing processing, the terminal audio processing unit 303 analyzes the audio signal acquired by the terminal mic 304, and performs a determination of whether or not an audio signal corresponding to the above described initiation notification portion 601 is included. For example, as described above, in cases in which the situation is such that an audio signal corresponding to a progress condition is included in a specific frequency band, the terminal audio processing unit 303 transforms the acquired audio signal into the frequency band by a fast Fourier transform, and separates other frequency bands from the audio signal. Then, the terminal audio processing unit 303 may determine whether or not the pattern of the predetermined initiation signal is included in the information of the corresponding frequency band. The terminal control unit 301 performs the determination of this step by recognizing that an audio signal corresponding to a progress condition is detected by a notification from the terminal audio processing unit 303. The terminal control unit 301 moves the processing to step S702 in cases where it determines that an audio signal for notifying a progress condition of the game content is acquired, and repeats the processing of this step in cases where it determines that such a signal is not acquired.

Note, audio collection by the terminal mic 304 may experience the influence of noise in the surrounding environment. For this reason, as explained above, in cases where the audio signal corresponding to the progress condition is played back multiple times, the terminal control unit 301 may perform the determination of this step in accordance with whether the terminal audio processing unit 303 detected the pattern of the initiation signal a predetermined number of times.

In step S702, the terminal audio processing unit 303, under the control of the terminal control unit 301, converts a pattern continuing from the pattern of the detected initiation signal into corresponding information (information indicating the progress condition) in accordance with a rule used for the generation of the information in the stationary game device 200. The information of the rule used for the generation may be stored in the terminal memory 302 along with the application data when the corresponding application is installed.

In step S703, the terminal control unit 301 generates the notification message to transmit to the SNS server 500 based on information that the progress condition obtained by the conversion indicates. The generation of a notification message may be realized by embedding data into a template that the user created beforehand, for example. Alternatively, it may be generated in accordance with a format appropriate for the application prepared beforehand, or it may be generated in a format in which information indicating the progress condition is simply put in itemized form.

Note, in cases in which the notification message is not limited to something that simply notifies an external terminal of the progress condition, but rather is for a multi-user online game, for example, usage exceeding just the level of a play-by-play, such as requesting support of another user by transmitting the progress condition, is possible.

In step S704, the terminal control unit 301 determines whether or not the state is such that message transmission to the SNS server 500 via the terminal communication unit 305 is possible. For example, the message transmission in this step is determined to be impossible in cases such as where the smart phone 300 is in a state in which communication with a base-station is impossible (so-called "out of range"), or cases in which a connection with a wireless LAN access point is not established, or the like. The terminal control unit 301 moves the processing to step S706 in cases where it determines that the state is such that message transmission to the SNS server 500 is possible, and moves the processing to step S705 in cases where it determines that the state is such that transmission in impossible.

In step S705, the terminal control unit 301 stores the generated notification message in the terminal memory 302. Here, the terminal control unit 301 may add the message to a transmission task queue so that the message will be transmitted when a state in which communication is possible is entered, or so that the user is able to transmit at a timing of the user's choice. Also, in cases of a configuration using notification messages as a play-by-play of progress conditions, a configuration may be taken in which the notification to the external terminal of the arrival time of the progress condition is possible even when the transmission is performed later, by the terminal control unit 301 adding or appending to the notification message a time stamp indicating a generation time of the message.

Meanwhile, in cases where it is determined that the state is such that message transmission is possible in step S704, the terminal control unit 301, in step S706, causes the generated notification message to be transmitted to the SNS server 500 by transmitting it to the terminal communication unit 305.

By doing this, the information indicating the progress condition of the game content can be transmitted using an audio signal, even if the state is such that data communication between the stationary game device 200 and the smart phone 300 is impossible. Also, notification of a terminal of another user of a progress condition of the game content without the user performing cumbersome operations during game operation is possible by the smart phone 300 generating a message in accordance with the information, and transmitting it to the SNS server 500. Also, because the operating user becomes able to confirm the history of the progress conditions that he or she reached after playing, it can be considered that with the game system, a user experience can be provided that makes it difficult for the interest of the operating user in the game content to be lost.

Note, in this embodiment, explanation was given having the progress condition for generating the audio signal be something that is set on the stationary game device 200, but working of the present invention is not limited to this. For the present invention, a configuration may be taken in which, for example, the stationary game device 200 generates and plays back, without selecting out, audio signals corresponding to various progress conditions, and notification messages are generated and transmitted only for items, out of the progress conditions, set beforehand on the smart phone 300.

[Variation]

In the above described embodiment, explanation was given for a situation in which the smart phone 300 receives the information indicating the progress conditions of the game content transferred using audio signals from the stationary game device 200, and shares the progress condition with another user by transmitting to the SNS server 500 which is an external device. In this variation, explanation will be given for a situation in which the smart phone 300 acquires related information from an external device in accordance with transmission of the information indicating the acquired progress condition.

Note, in this variation, the functional configuration of the stationary game device 200 and the smart phone 300 is the same as in the above described embodiment. Also, explanation is given having the external device of the smart phone 300, in the game system of the variation, be a dedicated server of a game content provider rather than the SNS server 500.

<Related Information Acquisition Processing>

Below, explanation will be given using the flowchart of FIG. 8 for related information acquisition processing, executed on the smart phone 300 of the variation, of acquiring an audio signal corresponding to a progress condition played back by the stationary game device 200 and acquiring related information corresponding to the progress condition from a dedicated server. Note, the related information acquisition processing will be explained as something that is initiated when an activation of a corresponding application is instructed in the smart phone 300, for example. Also, in the related information acquisition processing, identical reference numerals will be given for steps for performing the same processing as in the progress condition sharing processing of the above described embodiment, and their explanation will be omitted.

After the terminal audio processing unit 303 converts the audio signal into information indicating the progress condition in step S702, the terminal control unit 301, in step S801, generates a notification message to transmit to the dedicated server based on the information indicating the progress condition. The notification message may be something configured in accordance with a predetermined format, or it may be configured so as to include information by which it is possible for the dedicated server to identify the progress condition of the game content.

In step S802, the terminal control unit 301 causes the generated notification message to be transmitted to the dedicated server by transmitting it to the terminal communication unit 305.

In step S803, the terminal control unit 301 determines whether or not the terminal communication unit 305 has received related information corresponding to the progress condition from the dedicated server. The dedicated server, when it receives information indicating the progress condition of the game content, may return to the transmission source device, in accordance with the progress condition satisfying a specific condition, information such as, for example:

strategy information for an encountered battle opponent character navigation information based on a position of an operation target character a reward corresponding to a progress condition reached in the game (promotion information, a coupon, an award, special movie/audio content, etc.)

a progress condition of a user in a friend relationship playing the same game content as related information.

The terminal control unit 301 moves the processing to step S804 in cases where it determines that related information corresponding to the progress condition is received from the dedicated server, and repeats the processing of this step in cases where it determines that such information is not received. Note, the related information need not necessarily be distributed from the dedicated server in response to current progress conditions and in such a case, when it is determined that there is no reception of related information within a predetermined time period, the terminal control unit 301 may return the processing to step S701.

In step S804, the terminal control unit 301 displays on the terminal display unit 307 corresponding screen information in accordance with the related information and returns the processing to step S701.

By doing this, even if the state is such that data communication between the stationary game device 200 and the smart phone 300 is impossible, the smart phone 300 can receive related information corresponding to a progress condition from the dedicated server and provide it to a user. In other words, in cases where the user in the middle of game play, for example, wishes to view strategy information, it is possible to perform game play while viewing strategy information displayed automatically on the smart phone 300 without the user interrupting the game play and searching for the information corresponding to the progress condition. Also, because the smart phone 300 is superior compared to the stationary game device 200 in portability, it is possible for the user to carry around an award acquired in accordance with a progress condition without being in the installation location of the stationary game device 200. Because of this, opportunities for communication that are not tied to the game console, such as the user showing off awards to at another user at an outside place such as a school, for example, can be provided. Also, this kind of communication and secondary usage of acquired related information is not limited to game content advertising, it can be expected to be used for collaboration with various services.

Note, in the above described embodiment and variation, explanation was given having the audio signal that the smart phone 300 acquires be something that is output based on a progress condition for the game content being executed on the stationary game device 200, but working of the present invention is not limited to this. The present invention may be used in a configuration in which information transmission to a communication device having a recording function is performed, where the audio output by audio media such as a television show, a radio show or an advertisement is made to be a trigger, for example.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the game system according to the present invention are realizable by a program that causes a plurality of computers to function as the devices comprising in the game system. The program can be provided/distributed by being stored on a computer-readable storage medium or through an electronic communication line.

This application claims the benefit of Japanese Patent Application No. 2013-142132, filed Jul. 5, 2013, which is hereby incorporated by reference herein in its entirety.

What is claimed is:

1. A game system, comprising:
an information processing device;
a content providing device; and
an external device,
wherein the content providing device comprises:
 a memory configured to store a program of game content;
 a user interface configured to accept operation input for the game content;
 a central processor configured to read the program of game content and to control the game content in accordance with the operation input accepted by the user interface; and
 a first audio processor configured to generate, based on information of a progress condition of the game content caused to change by the central processor, and to play, audio data indicating the progress condition, and
wherein the information processing device comprises:
 a communication interface configured to acquire an audio signal played by the first audio processor;
 a second audio processor configured to extract the information of the progress condition from the audio signal acquired by the communication interface; and
 an output configured to output, to the external device, the information of the progress condition extracted by the second audio processor.

2. The game system according to claim 1, wherein:
the information processing device further comprises a second central processor configured to set a type of the information of the progress condition output to the external device by the output, and
the output is configured to output the type of the information of the progress condition set by the second central processor.

3. The game system according to claim 1, wherein the output, in accordance with the information of the progress condition being extracted by the second audio processor, outputs the information of the progress condition.

4. The game system according to claim 1, wherein the external device is configured to share the information of the progress condition with a plurality of connected devices.

5. The game system according to claim 1, wherein the first audio processor plays the audio data indicating the progress condition of the game content, the progress condition being attached to the audio data beforehand.

6. The game system according to claim 1, wherein the communication interface of the information processing device further receives information corresponding to the information of the progress condition from the external device.

7. An information processing device, comprising:
a communication interface configured to acquire an audio signal played by a first audio processor of a content providing device, based on audio data including information of a progress condition of game content that the content providing device provides, the audio data having been output from the content providing device;
an audio processor configured to extract the information of the progress condition from the audio signal acquired by the communication interface; and
an output configured to output, to an external device, the information of the progress condition extracted by the audio processor.

8. A non-transitory computer-readable storage medium storing a program for causing a computer to function as the information processing device according to claim 7.

* * * * *